(12) United States Patent
Liang et al.

(10) Patent No.: US 6,447,897 B1
(45) Date of Patent: *Sep. 10, 2002

(54) TEMPERATURE SENSITIVE SURFACES AND METHODS OF MAKING SAME

(75) Inventors: Liang Liang, Richland; Peter C. Rieke; Kentin L. Alford, both of Pasco, all of WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/568,782

(22) Filed: May 10, 2000

Related U.S. Application Data (60) Continuation-in-part of application No. 09/410,173, filed on Sep. 30, 1999, now Pat. No. 6,270,903, which is a division of application No. 09/036,363, filed on Mar. 6, 1998, now Pat. No. 5,997,961.

(51) Int. Cl.$^7$ .............................................. B32B 17/10
(52) U.S. Cl. ..................... 428/336; 428/333; 428/441; 428/442; 428/520; 428/522; 428/913
(58) Field of Search ................................. 428/336, 441, 428/442, 522, 520, 913, 333

(56) References Cited

U.S. PATENT DOCUMENTS

| | | | |
|---|---|---|---|
| 5,997,961 A | 12/1999 | Feng et al. | 427/515 |
| 6,270,903 B1 * | 8/2001 | Feng et al. | 428/429 |

OTHER PUBLICATIONS

Okano et al., "Temperature–responsive poly(N–isopropylacrylamide) as a modulator for alteration of hydrophilic/hydrophobic surface properties to control activation/inactivation of platelets," *J. Controlled Release* 36 (1995) 125–133.

Okano et al., "Mechanism of cell detachment from temperature–modulated, hydrophilic–hydrophobic polymer surfaces," *Biomaterials* 16 (1995) 297–303.

Yakushiji et al., "Graft Architectural Effects on Thermoresponsive Wettability Changes of Poly(N–isopropylacrylamide)–Modified Surfaces," *Langmuir* 1998, 14 4657–4662.

Liang et al., "Reversible Surface Properties of Glass Plate and Capillary Tube Grafted by Photopolymerization of N–Isopropylacrylamide," *Macromolecules* 31 (1998) 7845–7850.

Kobayashi et al., "Silane Coupling Agents for Photografting of Vinyl Monomer." *Chem. Lett.* (1992) 1321–1324.

Kobayashi et al, *J. Appl. Polym. Sci.* (1993), 49(3), pp. 417–423.

Miron et al., "A Spectrophotometric Assay for Soluble and Immobilized N–Hydroxysuccinimide Esters," *Analytical Biochem.* (1982) 433–435.

Liang et al., "Preparation of Composite–Crosslinked Poly(N–isopropylacrylamide) Gel Layer and Characteristics of Reverse Hydrophilic–Hydrophobic Surface," *J. Appl. Polymer Science* 72 (1999) 1–11.

* cited by examiner

*Primary Examiner*—D. S. Nakarani
(74) *Attorney, Agent, or Firm*—Stephen R. May; Frank S. Rosenberg (57) ABSTRACT

Poly-n-isopropylacrylamide surface coatings demonstrate the useful property of being able to switch charateristics depending upon temperature. More specifically, these coatings switch from being hydrophilic at low temperature to hydrophobic at high temperature. Research has been conducted for many years to better characterize and control the properties of temperature sensitive coatings. The present invention provides novel temperature sensitive coatings on articles and novel methods of making temperature sensitive coatings that are disposed on the surfaces of various articles. These novel coatings contain the reaction products of n-isopropylacrylamide and are characterized by their properties such as advancing contact angles. Numerous other characteristics such as coating thickness, surface roughness, and hydrophilic-to-hydrophobic transition temperatures are also described. The present invention includes articles having temperature-sensitve coatings with improved properties as well as improved methods for forming temperature sensitive coatings.

23 Claims, 8 Drawing Sheets a b c

TEMPERATURE SENSITIVE SURFACES AND METHODS OF MAKING SAME

RELATED APPLICATIONS

This application is a continuation-in-part of U.S. Ser. No. 09/410,173 filed Sep. 30, 1999, now U.S. Pat. No. 6,270,903, which is a divisional of U.S. Ser. No. 09/036,363 filed Mar. 6, 1998, now U.S. Pat. No. 5,997,961, incorporated herein by reference as if reproduced in full below.

This invention was made with Government support under Contract DE-AC0676RL01830 awarded by the U.S. Department of Energy. The Government has certain rights in the invention.

FIELD OF THE INVENTION

The present invention relates to temperature sensitive surfaces, methods of bonding functional surface materials such as poly(N-isopropylacrylamide)(PNPIPAAm) to substrates and applications in microtechnology and anti-fouling.

BACKGROUND OF THE INVENTION

The ability to control surface properties has, for many years, been an important goal for materials scientists working in a wide variety of areas. Many techniques have been explored to modify surfaces, including plasma treatment, corona discharge, ozone treatment, electron-beam bombardment, and ultraviolet (UV) and X-ray irradiation. Surface properties can be modified by applying a polymer, such as by photopolymerization. See, for example, C. G. Roffey, *Photopolymerization of Surface Coating*, John Wiley and Sons, New York, 1982, Chapter 3. Poly(N-isopropylacrylamide) (PNIPAAm) is an especially interesting and important polymer for controlling surface polymers. This polymer, and related polymers such as copolymers comprising the isopropylacrylamide (IPAAm) monomer, exhibit thermally reversible changes in response to temperature changes. More particularly, in an aqueous system (i.e., in water), increasing the temperature of surfaces modified by PNIPAAm changes the surface from hydrophilic (water-loving) to hydrophobic (water-repellant). The temperature at which the surface changes from hydrophilic to hydrophobic is known as the lower critical solution temperature (LCST). Attachment to various surfaces and properties of surfaces modified with PNIPAAm has been described in numerous references including: T. Yakushiji, et al., *Langmuir*, 1998, 14, 4657; T. Okano et al., *J. Controlled Release* 1995, 36, 125; and L. Liang et al, *J. Appl. Polym. Sci.*, 1999, 72, 1. Grafting PNIPAAm within a capillary tube or sponge has been identified as a potentially intelligent switch and control valve, respectively. See L. Liang, et al., *Macromolecules*, 1998, 31, 7845; L. Liang et al., *J. Appl. Polym. Sci.*, 2000, 75, 1735.

Despite previous efforts toward developing thermally responsive and reversible surfaces, there remains a need for thermally responsive surfaces that have relatively thin, polymeric surface coatings and yet exhibit desirable properties such as: narrower ranges for the hydrophilic/hydrophobic change, relatively low contact angles at low temperature, high contact angles at high temperature, a large change in contact angles across the LCST, high grafting density and fast property changes in response to temperature changes. There is also a need for new methods of making thermally responsive surfaces that are simpler, less expensive, use fewer materials, and/or result in surfaces having superior properties.

SUMMARY OF THE INVENTION

The present invention provides an article having a thermally sensitive surface in which a thin coating is disposed over a substrate. The thin coating has a thickness of less than 50 nm and comprises the reaction product of IPAAm. This thermally sensitive surface is characterized by a LCST of at least 25° C. and an advancing contact angle of less than 60° at low temperature and greater than 80° at high temperature. The use of the term "low temperature" in this application refers to a temperature above 0° C. but below the LCST, while "high temperature" refers to a temperature below 100° C. but above the LCST. For the present invention, the advancing contact angle is measured according to the technique described herein in the Examples section. The invention can comprise a variety of shapes and conformations; however, the contact angle should be measured on an essentially flat area of the temperature sensitive coating. If the article lacks any essentially flat areas, the contact angle should be measured on a test surface that is flat but otherwise identical to the article in question.

The present invention further provides an article having a thermally sensitive surface in which a cross-linked coating is disposed over a substrate. This coating is the reaction product of a composition that includes IPAAm and a crosslinking agent. The temperature sensitive surface is characterized by an advancing contact angle of less than 20° at low temperature and greater than 80° at high temperature.

The invention also provides methods of forming thermally sensitive surfaces. In one method, a photosensitizer is reacted onto a surface to provide a reactive surface; a composition comprising IPAAm is applied onto the reactive surface; and the composition is photopolymerized to result in a thermally sensitive surface having a thin polymeric coating having a thickness of less than about 50 mn. This thin coating has an advancing contact angle of less than 60° at low temperature and greater than 80° at high temperature.

In another method, a surface modifier is reacted onto a surface to provide a reactive surface; a composition comprising IPAAm and a crosslinking agent is applied onto the reactive surface; and the composition is thermally polymerized to result in a temperature sensitive surface having a crosslinked polymeric coating having an advancing contact angle of less than 20° at low temperature and greater than 80° at high temperature.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

A large variety of articles can be made to have temperature responsive surfaces. These articles can include, but are not limited to, biosensors, chemical reactors, and microchannel devices. Microchannel devices have channels or other components that have a dimension of about one micrometer or less. Typically, only a portion of the articles have a temperature responsive surface. These surfaces can be on the exterior or interior, such as the surface of a microchannel inside of a microchannel device. The inventive articles also include temperature-sensitive sensors, switches, actuators, controlled valves, multi-functional separation membranes, temperature sensitive absorbers, controlled release surfaces, cell culture surfaces, and materials for chromatographic analysis.

These articles can be viewed as including a substrate and a coating. For ease of bonding, these surfaces preferably have surface hydroxyls or can be modified to have surface hydroxyls. Examples of preferred substrates are silicon and glass. Plastic can also be used, and the substrate plastics preferably have surface hydroxyls either resulting from the synthesis or resulting from surface treatments such as exposure to a plasma. Examples of plastic substrates reported in the prior art include poly(glycidylmethacrylate-co-ethylenedimethacrylate), polystyrene, and polypropylene. Metals can also be used. In some preferred embodiments of the present invention the substrates are essentially nonporous.

Surface modifiers, when used, provide a bonding link between the substrate and a temperature sensitive polymer. Surface modifiers include at least two moieties—one for reacting with and bonding to substrate surfaces; and one for reacting with and bonding to a temperature sensitive monomer or polymer. Silicon alkoxides and halides are effective moieties for bonding to a variety of substrates. For use in photo-reactions, photoreactive moieties can bond to: the substrate, the temperature sensitive monomer or polymer, or both. Reactions with the surface can occur prior to, simultaneous with, or subsequent to polymerization of the temperature sensitive polymer. Examples of surface modifiers include: vinyltriethoxysilane, acryloyl chloride, vinyldimethylchlorosilane, and methylacryloxypropyltrimethoxysilane. A preferred surface modifier is N,N'-(diethylamino)dithiocarbamoylpropyl(trimethoxy)silane (DATMS), which has shown unexpectedly superior results in the formation of thin, temperature sensitive coatings.

Compositions for preparing the temperature sensitive coating preferably contain N-isopropylacrylamide (IPAAm). IPAAm has been found to be a superior material for making temperature sensitive layers. It is known that pure IPAAm polymers and copolymers made from monomers or oligomer mixtures comprising IPAAm can form temperature sensitive layers. While polymers containing IPAAm form the best temperature sensitive layer, it is further contemplated that other polymers having similar or superior properties could be identified, and that these could be equivalently substituted in the temperature sensitive polymer layer of the present invention. In one preferred embodiment for forming a thin, temperature sensitive coating layer, the temperature sensitive polymer layer is formed from a surface modifier and pure IPAAm. The temperature sensitive polymer preferably has a single, terminal attachment to the substrate. Especially in thin, uncrosslinked films, multiple attachment points of each polymer strand to the substrate are undesirable.

Coating presursor compositions typically comprise one or more of the following: monomers, polymers, surface modifiers, initiators, and accelerators. In the present invention, the term "polymers" includes oligomers. For photo-reactions, the precursor composition preferably contains a photosensitizer. An example of an initiator is potassium persulfate, and an example of an accelerator is N,N,N',N'-tetramethyldiamine (TMEDA). Examples of thermal initiators include 2,2'-azobisisobutyronitrile (AIBN) and benzoyl peroxide. Most thermal initiators are soluble in organic solvents and decompose above 50° C. For the formation of relatively thicker, but more responsive coatings, the precursor composition preferably comprises at least one cross-linking agent. A preferred crosslinking agent is N,N'-methylenebisacrylamide (BisAAm). The attachment to the surface and polymerization of the temperature sensitive coating can be done in multiple steps or in a single step. For example, in one preferred embodiment, a composition comprising a surface modifier/photosensitizer and IPPAm can be exposed to ultraviolet (UV) radiation, thus resulting in a single step preparation of a temperature sensitive coating.

Due to the complexity and variability of the chemical bonding in the surface coating, it is not always possible to precisely elucidate the chemical structure in each layer. However, inventive coatings can be well-defined by reference to various properties exhibited by the temperature sensitive coating. Thin, temperature sensitive coatings are highly desirable and are especially important in applications where reducing volume is important; for example, within a microchannel. Preferably, the coating has a thickness of less than about 500 nanometers (nm), more preferably less than 50 nm, and still more preferably between about 4 to about 10 nm. These thicknesses are measured by ellipsometry in the dry state, according to the method described herein. At these thicknesses, the temperature sensitive surface is characterized by an advancing contact angle of less than 60° at low temperature and greater than 80° at high temperature; more preferably, less than 45° at low temperature. In another preferred embodiment, the advancing contact angle is between about 40° and 55° at low temperature and between about 85° and 100° at high temperature.

Another important characteristic is grafting density of the polymer on the substrate. Increasing grafting density is indicated by increasing LCST. Thus, in preferred embodiments, the LCST is greater than 25° C., more preferably greater than 28° C., and still more preferably greater than 30° C.

The relatively thicker, crosslinked temperature sensitive surfaces can also be characterized by their temperature sensitive properties. These surfaces can be characterized by an advancing contact angle of less than 20° at low temperature and greater than 80° at high temperature. More preferably, the surfaces have an advancing contact angle of less than 10° at low temperature and greater than 90° at high temperature. The temperature sensitive changes to surface properties are reversible.

Figure 1:
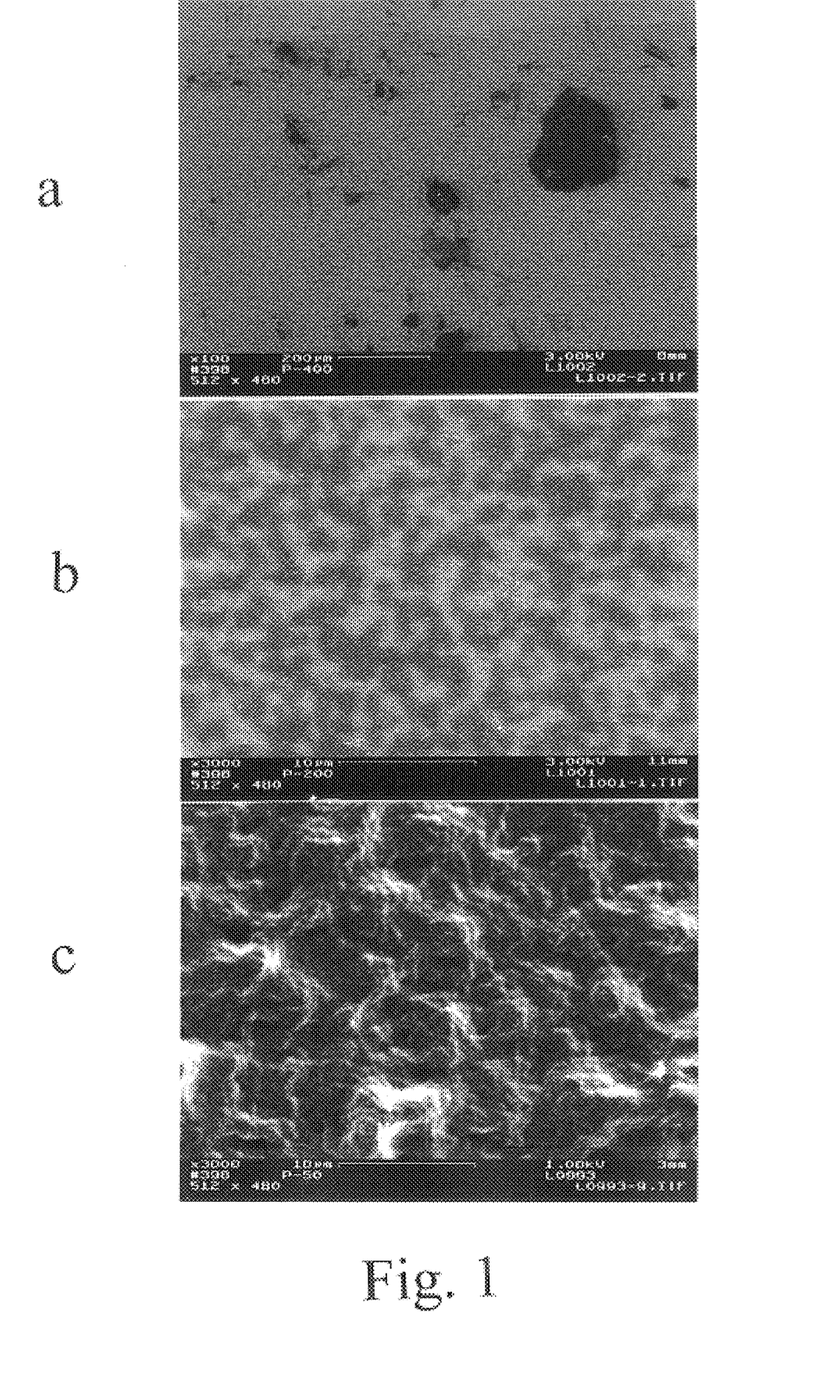
FIG. 1. SEM pictures of a silicone wafer surface grafted by a crosslinked PNIPAAm layer with different molar ratios of NIPAAm to BisAAm. (a) molar ratio of NIPAAm to BisAAm: 400; (b) molar ratio of NIPAAm to BisAAm: 200; (c) molar ratio of NIPAAm to BisAAm: 50. Polymerization time: 24 hours; concentration of NIPAAm: 7 wt %; solvent: water.

Another characteristic property of preferred embodiments of the present invention is the surface morphlgy that can be observed by scanning electron microscopy (SEM). Preferred surfaces have a rough, mountain-valley as shown by FIG. 1c, as compared with the smoother surface morpholgies shown in FIGS. 1a and b. Other important advantages of the inventive temperature sensitive coatings include their antifouling and antifogging properties.

Another way to characterize the temperature sensitive surfaces is by height of a water meniscus in a 2 mm internal diameter glass capillary tube. Preferably, the temperature sensitive surface has a water meniscus level at low temperature of at least 10 mm, and about 0 mm at high temperature.

Certain advantages of the present invention can be shown by comparison with the prior technology. Coating the substrate with PNIPAAm gel with a crosslinking agent generated an inhomogenous surface and a thick grafting layer (~1800 Å). However, thin and homogenous surfaces were obtained by coating the substrate with PNIPAAm without a crosslinking agent.

EXAMPLES

Materials: N-isopropylacrylamide (NIPAAm, 97%, Aldrich) was purified by recrystallization from hexane. Chloropropyltrimethoxysilane (CPTMS, 97%, Aldrich) and vinyltriethoxysilane (VTES, Gelest) were purified by reduced pressure distillation. Acetone (99.9%, Aldrich) was dried by $CaCl_2$ (Aldrich) and a 4 Å molecular sieve (Aldrich) for 4 days, respectively, and then refluxed in the presence of $AlH_4Li$ (Aldrich) for 48 hours before distillation. Anhydrous toluene (99%, Aldrich) was purified by distillation. Sodium N,N'-diethyldithiocarbamate (SDDC) was recrystallized from methanol. We used N,N'-methylenebisacrylamide (BisAAm, 95%, Aldrich), 3-mercaptopropionic acid (MCPA, 99%, Aldrich), dichlormethane (99%, Aldrich) and 2,2'-azobisisobutyronitrille (AIBN, Aldrich) without purification. Ultrapure water with a conductivity of 18 $Scm^{-1}$ was used in all experiments. Silicon wafers that were polished and p-doped were obtained from Silicon-Source Technol. Inc.

X-ray Photoelectron Spectroscopy (XPS). XPS data were collected on a Phi Quantum 2000 Scanning ESCA Microprobe using a monochromatic Al K$\alpha$ x-ray source. The analysis area was 1.5 mm×0.2 mm. A typical mutilplex pass energy is 23.5 eV, and a typical survey pass energy is 117.4 eV. The takeoff angle is 45°. The charge correction is calculated from the difference of the observed carbon 1s binding energy from the calculated 284.8 eV value for the carbon 1s binding energy. The composition of the PNIPAAm layer on the surface of silicon wafer was analyzed by the relative peak area.

Static Contact Angle: The static contact angle of water on the surface of the substrates was measured by a contact-angle goniometer (100-00, Rame-Hart, Inc.). One water drop (10 $\mu$L) was deposited on the dry surface of a silicon wafer. The angle was measured as soon as possible after a sessile drop of water formed on the surface of the substrates. The static contact angle could be read directly from the goniometer. All measurements were done at room temperature (about 22° C.) and about 40% humidity. The five points on the surface were chosen at random for the measurement. The mean data were taken as final data, and they have standard deviations less than 5%.

Dynamic Contact Angle: The dynamic contact of silicon wafers with and without the grafted PNIPAAm gel was measured using a dynamic Wilhelmy plate technique (DCA-312, Cahn Instrument Inc.). The temperature of the test chamber (100 mL) was controlled by a thermostated circulator to ±0.2° C. The advancing contact angles were measured at an immersion speed of 10 mm/min with a 10-mm immersion depth. A computer automatically recorded the hysteresis curve for the surface tension-immersion depth in water. Each measurement took five consecutive strokes. The data of the last three strokes were employed to calculate the contact angle using the standard calculation procedure (DCA4A, Cahn Instrument Inc.). The mean data with a standard deviation less than 5% are shown in the figures.

Ellipsometery: Spectroscopic ellipsometry (Gaertner Ellipsometer) was used to determine the thickness of the oxide layer, the immobilized photosensitizer layer, and the grafting PNIPAAm layer on the surface of the silicone wafers. All samples were dried in the vacuum oven at 30° C. overnight before measurement. The measurements were done immediately after the samples were taken out of the oven. At least five points on the sample surface were measured, and the thickness was calculated by a standard procedure (Auto, Gaertner Ellipsometer). The refractive index of the monolayer and underlying oxide was taken as 1.46. The thickness of the organosilane layer was calculated by subtracting the thickness of the oxide layer from the total thickness.

Thin, Thermally-Sensitive Coatings

Preparation of (N,N'-diethylamino) dithiocarbamoylpropyl(trimethoxy)silane (DATMS). The following typical synthesis was used to synthesize DATMS. We dissolved 12.0 g of CPTMS (60 mmol) and 4.0 g of SDDC (23 mmol) in 100 mL of acetone by stirring at room temperature. The solution was transferred into one 250-mL round-bottom flask and allowed to be refluxed for 48 hours. During this process, DATMS as the photosensitizer was synthesized by the reaction between CPTMS and SDDC with white precipitation of NaCl as the by-product. The solution was cooled down to room temperature, and NaCl was separated by centrifugation. The unreacted CPTMS and the residence solvent were evaporated by reduced pressure distillation. The final product was a yellow-colored viscous liquid with a yield of 69%.

The identity of the photosensitizer was confirmed by FTIR and NMR spectroscopy. The C—H stretching bands of the propyl group and the asymmetric stretch of the methoxy group fall together in one broad peak at 2950 cm$^{-1}$. The CH$_2$ scissoring vibration can be found at 1410 cm$^{-1}$. The strong bands at 1090 and 820 cm$^{-1}$ were attributed to the Si—O and Si—O—C stretching mode. Peaks at 1280 and 1350 cm$^{-1}$ were assigned to the dithiocarbamate group. The peaks at 40 and 195 ppm in the $^{13}$C NMR spectrum were attributed to carbon in C—S and the C=S group. The peaks at 48 and 51 ppm were assigned to the carbon in the methoxyl group. The peaks at 47 and 50 ppm were attributed to carbon in the methylene group.

Modification of silicon wafers: silicon wafer substrates were cut to 25mm×10 mm. The substrates were immersed in 2-isopropanol and cleaned by a supersonic wave for 15 min. After rinsing the substrates thoroughly with water, they were dipped into 0.1 N KOH for 2 min and 0.1 N HNO$_3$ for 10 min, respectively. Then they were washed with an excess of water and dried by blowing dry nitrogen gas for 2 hours before reaction with the photosensitizer. To immobilize the photosensitizer on the surface of the substrates, the substrates were immersed in 100 mL of toluene containing 5 g DATMS. The reaction was performed in a plate-bottom flask connected to a reflux condenser for 24 hours at 110° C. Finally, the substrates were rinsed with dichloromethane for 5 min and dried under a stream of dry nitrogen gas overnight at room temperature.

Preparation for grafting PNIPAAm on substrates: The following procedure was used to prepare the surfaces for grafting the PNIPAAm chain. We dissolved 5 g of NIPAAm in 15 mL of water by stirring for 1 hour. The solution was poured into a 100-mL quartz flask with a rubber septa and deoxygenated by nitrogen gas bubbling for 30 min. Finally, the upper space of the flask was filled with nitrogen gas. Polymerization was started by irradiating the solution using two 100 W high-pressure mercury lamps and a UV wavelength of 254 nm. The quartz flask was put inside UV lamps, and the distance of the substrate to the UV lamps was 10 cm. After finishing photopolymerization, the substrates were washed with water and sonicated in water for 30 min to clean the surfaces. The substrates were completely dried in a vacuum oven at room temperature.

Fourier Transfer Infrared (FTIR) Spectrum: The FTIR spectrum of the photosensitizer was measured by FTIR instrument (Magan-IR 860, Nicolet). The scan number and spectra resolution were 100 and 4 cm$^{-1}$, respectively.

Spectrum of nuclear magnetic resonance (NMR): NMR data were collected on a Chemagnetics CMX300 NMR spectrometer operating at 298.3 MHz for the proton frequency. We used $^{13}$C-labeled chloroform (Aldrich) without further purification.

Discussion of Thin, Temperature Sensitive Coatings

Figure 2:
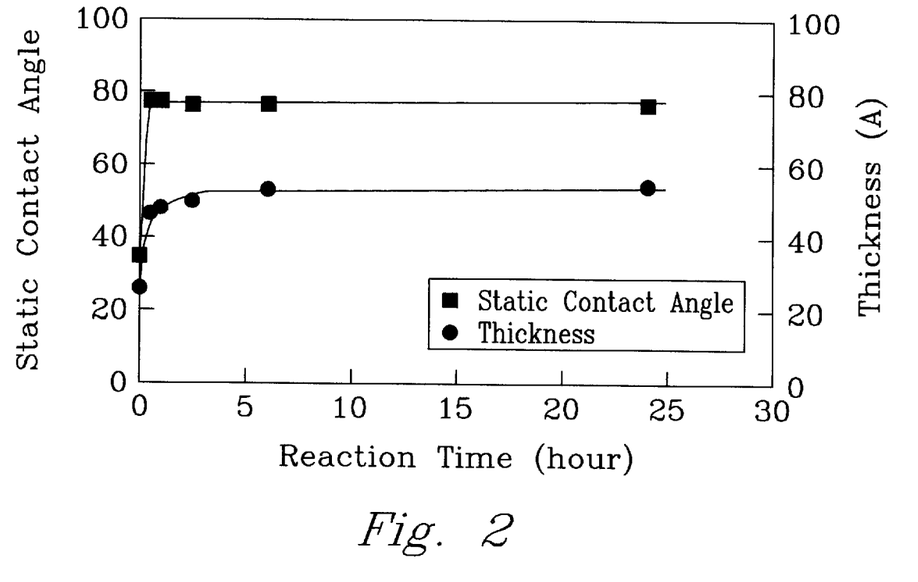
FIG. 2. Effect of reaction time on static contact angle and thickness of photosensitizer coated on the substrate. Concentration of DATMS: 5 wt % in toluene.

As shown in FIG. 2, both the static contact angle and the thickness of the photosensitizer coated on the substrate increase with increasing reaction time of DATMS with the silicon wafer. During the initial reaction, a rapid increase in the static contact angle and the thickness of the photosensitizer coated on the substrate was observed, indicating that the condensation reaction to immobilize the photosensitizer on the substrate is a fast process.

The static contact angles of the substrates before and after reacting with a photosensitizer are 37° and 70°, respectively. The increase of the contact angle can be attributed to the fact that the substrates with a hydrophilic OH group (before reacting with photosensitizer) were covered by a more hydrophobic group in the photosensitizer. The thickness of the photosensitizer coated on the substrate was calculated by subtracting the thickness of the oxide layer from the total thickness of the coating layer. Table 1 shows the thickness of the photosensitizer coated on the substrate and the thickness difference between the experimental and calculated data, which increases with increasing reaction time. The thickness difference is small at the shorter reaction time, and it increases with increasing reaction time. This could be due to a multi-molecular layer with a loose network structure formed on the surface of the substrate.

TABLE 1

Thickness of Substrate Grafted by Photosensitizer

| Reaction time (hour) | Thickness of photosensitizer (Å) | Thickness difference* (Å) |
|---|---|---|
| 0.5 | 20.4 | 3.2 |
| 1.0 | 22 | 4.8 |
| 2.5 | 24 | 6.8 |
| 6.0 | 27 | 9.8 |
| 24.0 | 28 | 10.8 |

*Calculation by subtracting the theoretical thickness of the photosensitizer from the experimental thickness of the photosensitizer.

Figure 3:
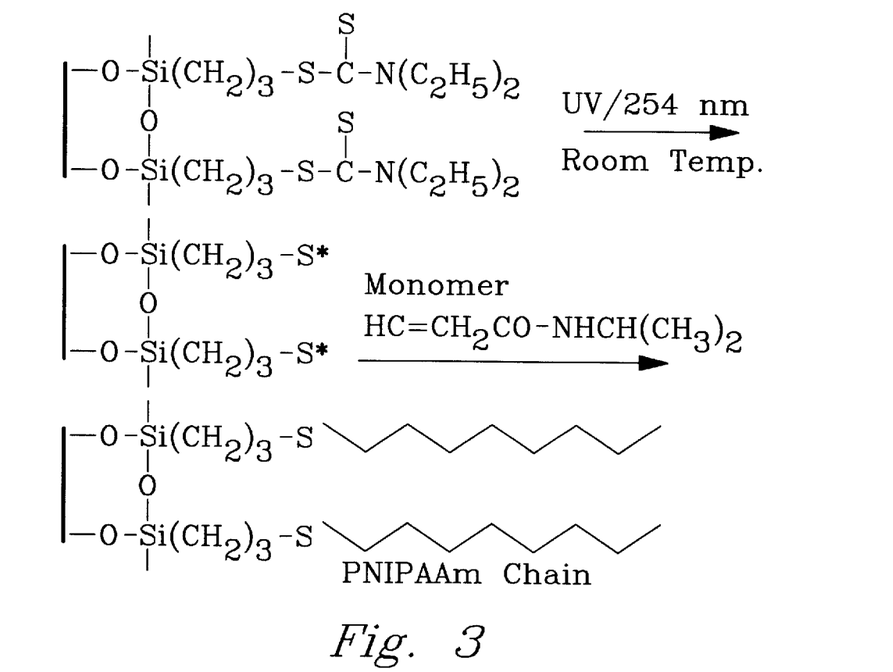
FIG. 3. Schematic representation of grafting PNIPAAm on the surface of a silicon wafer.
Figure 4:
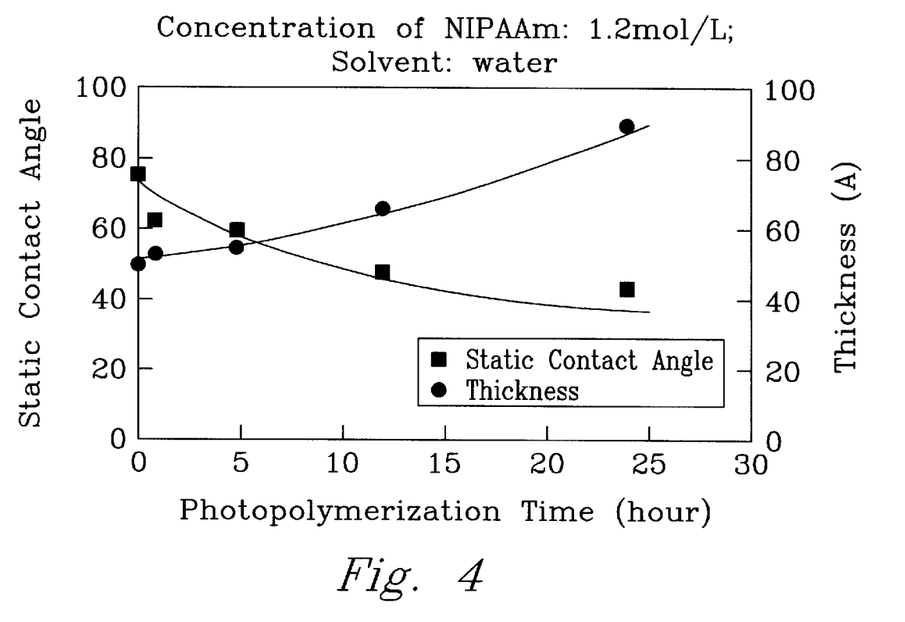
FIG. 4. Effect of photopolymerization time on static contact angle and thickness of grafting layer on the substrate. Concentration of NIPAAm: 1.2 mol/L; solvent: water.

FIG. 3 schematically illustrates photografting NIPAAm onto a silicon wafer. The free radicals on the substrate can be generated by fission of the S—C bond in the photosensitizer by irradiation with UV light. The free radicals generated on the substrate can further attack the double bond of NIPAAm in solution to graft PNIPAAm on the substrate. FIG. 4 shows the effect of photopolymerization time on static contact angle and grafting layer thickness. As the photopolymerization time increases, the thickness of the grafting layer increases, while the static contact angle decreases. Before photopolymerization, the thickness of the photosensitizer coated on the substrate is 54 Å. The thickness of the coating (including photosensitizer) increases to 90 Å after 24 hours of photopolymerization. Increasing the photopolymerization time increases the probability that the monomer will be grafted on the substrate; therefore, the thickness of the grafting layer increases. Because of the flexibility of the polymer chain, the conformation of the polymer chain would be a random coil on the substrate, which reduces greatly the real length of the polymer chain on the substrate. On the other hand, the static contact angle of the substrate decreased from 78° to 44° when the reaction time changed from 0 to 24 hours. This is because more hydrophilic PNIPAAm chains attached on the substrate increase the wettability of the substrate, which decreases the contact angle.

Figure 5:
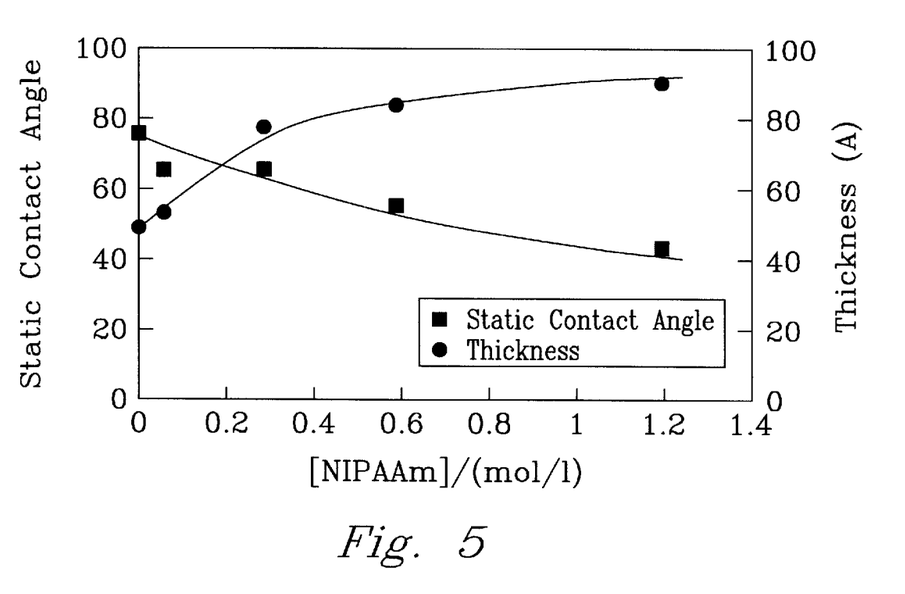
FIG. 5. Effect of monomer concentration on static contact angle and thickness of grafting layer on the substrate. Photopolymerization time: 24 hours; Solvent: water.

Since the photopolymerization rate is proportional to the concentration of monomer, it can be expected that more polymer will be grafted on the substrate as the concentration of the monomer is increased. FIG. 5 shows the effect of monomer concentration on the static contact angle and the thickness of the grafting layer when the photo polymerization time was kept at 24 hours. When the monomer concentration was increased from 0.06 mol/L to 1.2 mol/L, the contact angle of the substrate decreased from 66° to 44°, while the thickness of the grafting layer increased from 54 Å to 90 Å. Thus, it is clear that the surface properties of substrates can be adjusted and manipulated by polymerization time and the monomer concentration.

Figure 6:
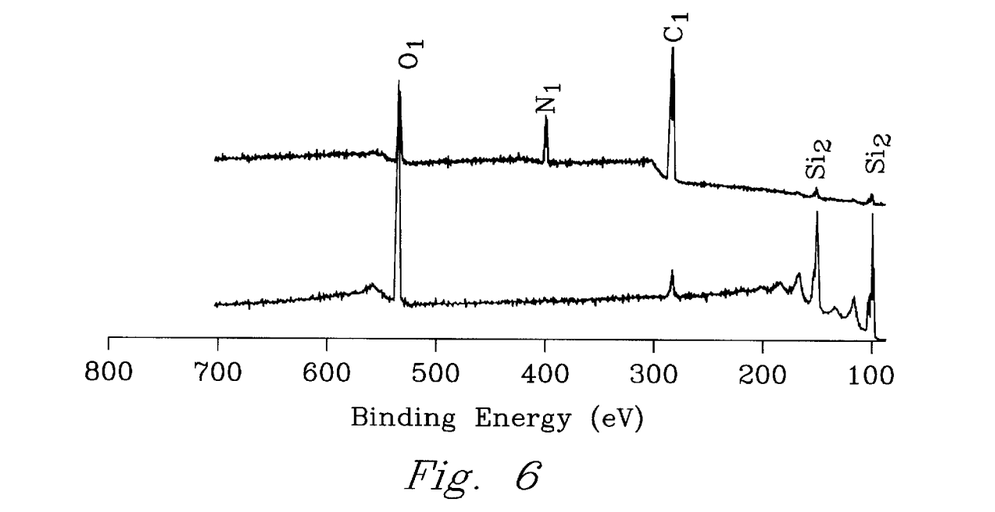
FIG. 6. XPS spectrum of: (top) substrate grafted by PNIPAAm: concentration of NIPAAm: 1.2 mol/L; solvent: water; photopolymerization time: 24 hours; and (bottom) original silicon wafer.

The substrates grafted by PNIPAAm were evaluated by XPS to prove the existence of the grafted PNIPAAm layer on the substrate. FIG. 6 shows the XPS spectra of the original substrate and the substrate grafted by PNIPAAm. The peaks of oxygen ($O_{1s}$), nitrogen ($N_{1s}$) and carbon ($C_{1s}$) at 532, 409, and 284 eV are attributed to the structure of PNIPAAm. The original substrate did not exhibit a nitrogen peak and the silicon peaks almost disappear after polymerization. Table 2 lists the compositions of surfaces grafted by PNIPAAm and the N/C ratios calculated from XPS data. The formulation of PNIPAAm is also given for the purpose of comparison. The N/C ratios measured experimentally are close to those calculated by the formulation of PNIPAAm, which indicates that the surface was covered by a PNIPAAm chain.

TABLE 2

Composition of Surface Grafted by PNIPAAm

| Tested points | Element (%) | | | | |
| --- | --- | --- | --- | --- | --- |
| | C | N | O | Si | N/C |
| 1 | 62.5 | 9.2 | 17.1 | 11.2 | 0.147 |
| 2 | 70.6 | 11.3 | 14.3 | 3.78 | 0.159 |

N/C = 0.166 (calculation by formulation of NIPAAm).

Figure 7:
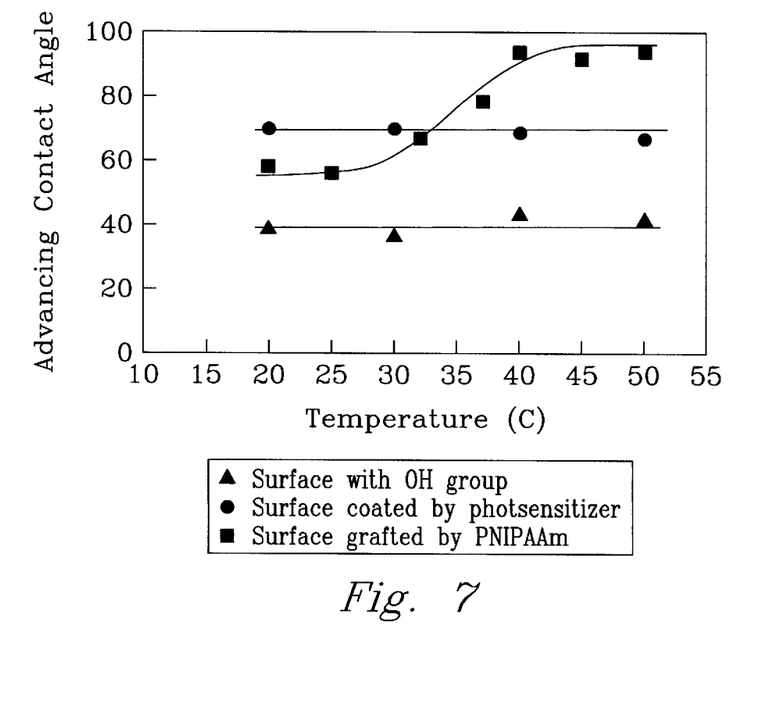
FIG. 7. Advancing contact angle of: (■) Substrate grafted by PNIPAAm: concentration of NIPAAm: 1.2 mol/L; solvent: water; photopolymerization time: 24 hours; (●) surface coated by photosensitizer; and (♦) uncoated silicon wafer.

The substrate grafted by a PNIPAAm chain exhibited temperature-sensitive characteristics; that is, a reversible change of the hydrophilic/hydrophobic surfaces was observed by changing the temperature. Such characteristics were investigated by measuring the dynamic contact angle using ultrapure water as the probe liquid. FIG. 7 shows the change that results as a consequence of advancing the contact angle of different substrates as a function of temperature. The substrate with an OH group (before reacting with the photosensitizer) has a lower contact angle, while the substrate coated by photosensitizer keeps a higher contact angle in the whole range of temperature variation. The different contact angles can be attributed to the hydrophilic and hydrophobic properties of the OH and photosensitizer groups, respectively. Because neither the OH nor the photosensitizer groups respond to temperature stimuli, the contact angle of the substrate with OH and photosensitizer groups is independent of temperature change. The substrate grafted by PNIPAAm showed temperature sensitive characteristics. At lower temperature, the PNIPAAm chain is swollen by water; therefore, a lower advancing contact angle was observed. When the temperature is increased to above the LCST of the PNIPAAm, an abrupt shrinkage of the PNIPAAm chain on the surface causes the surface to become hydrophobic, and the advancing contact angle of the surface increases. The contact angle of the substrate with the PNIPAAm chain is higher than that with OH groups, but lower than that with photosensitizer groups below LCST. This is because the PNIPAAm chain with a loose coil structure on the substrate may result in a substrate with incomplete wettability. The contact angle of the substrate with PNIPAAm is higher than that with a photosensitizer above LCST. The PNIPAAm chain was dehydrated and exhibited more hydrophobicity than the photosensitizer group at a higher temperature. Therefore, the advancing contact angle of the substrate grafted by PNIPAAm is higher than that with a photosensitizer group above LCST. From FIG. 7, we can also see the transition temperature, that is, the temperature at which a marked change of advancing contact angle can be observed, is around 32° C.

Crosslinked PNIPAAm Hydrogel Coating

Modification of silicon wafers. Polished and p-doped silicon wafers were cut along the crystal axes into 25 mm×10 mm samples. The wafers were sonicated for 15 min in 2-isopropanol to remove any trace organic residue and to ensure a uniform oxide coat. The precleaned silicone wafers were immersed into 0.1 N KOH for 2 min and 0.1 N $HNO_3$ for 10 min, respectively, followed by washing with an excess of water. The silicon wafers were further dried under flowing nitrogen gas for a minimum of 2 hours before immersion in the organosilane solution. To generate functional groups on the surface of silicon wafers, the dried wafers were immersed into anhydrous toluene containing 5 vol. % of vinyltriethoxysilane. The reaction was performed in a plate-bottom flask connected to a reflux condenser for 24 hours. The silicon wafers were washed by dichloromethane and sonicated in 2-isopropanol to quench a residual organosilane after reaction. Then, the silicone wafers were dried under a stream of dry nitrogen gas overnight at room temperature to allow interstitially trapped solvent to evaporate. With the same procedure, the glass capillary tubes were coated with VTES.

Preparation of crosslinked PNIPAAm layer on surface of silicon wafer. The crosslinked PNIPAAm layer was grafted on the surface of a silicon wafer coated with VTES with thermal free-radical polymerization. The schematic representation of the grafting procedure is shown in FIG. 1. Table 3 lists the recipe to graft the crosslinked PNIPAAm layer on the surface of the silicon wafer. We used the following preparation procedure. We dissolved 7.0 g of NIPAAm (62 mmol) and 0.0477 g of BisAAm (0.62 mmol) into 100 mL of water by stirring. The solution was transferred into a 250 mL plate-bottom flask with three necks and equipped with a reflux condenser. The silicon wafers coated with VTES were immersed in the solution. Then, the solution was deoxygenated by nitrogen gas bubbling for 30 min. Finally, the upper space of the flask was filled with nitrogen gas. The polymerization was carried out with reflux at 100° C. for 24 hours. During this process, free radicals were generated by thermal decomposition of double bonds immobilized on the surface of the silicon wafer. The free radicals on the surface of the silicon wafer further attack the monomer and the crosslinking agent to generate the crosslinked PNIPAAm layer on the surface of the silicon wafer. The silicon wafers grafted by a crosslinked PNIPAAm layer were rinsed by methanol and water to remove any unreacted monomer, crosslinking agent, and unimmobilized polymers. Before measurements, the silicon wafers grafted by a crosslinked PNIPAAm layer were immersed in water for 24 hours, then dried in a vacuum at room temperature.

TABLE 3

Composition of Polymerization Solution Used to Generate Crosslinked PNIPAAm Gel

| NIPAAm to BisAAm (Molar Ratio) | NIPAAm (g) | BisAAm (g) | Water (mL) |
| --- | --- | --- | --- |
| 50 | 7 | 0.191 | 100 |
| 100 | 7 | 0.095 | 100 |
| 200 | 7 | 0.048 | 100 |
| 400 | 7 | 0.024 | 100 |

Preparation of linear PNIPAAm. Linear PNIPAAm was synthesized to compare the structure and transition temperature of the polymer with the crosslinked PNIPAAm. We used the following reaction procedure to synthesize linear PNIPAAm. We dissolved 3.0 g of NIPAAm, 0.017 g of AIBN, and 23.0 μL of MCPA in 30 mL of methanol by stirring. The mixture solution was transferred into a 100 mL round-bottom flask. The flask was first vacuumed and subsequently filled with nitrogen gas. This process was repeated three times. To start the polymerization, the solution was heated to 60° C. for 24 hours. After the reaction, the solution was concentrated by evaporation, and the reactant was poured into diethyl ether to precipitate the polymer. The polymer was further purified by repeated precipitation from tetrahydrofuran into diethyl ether. The final polymer was dried in a vacuum until completely dry. The molecular weight of polymer was measured by chemical titration of carboxyl groups at the end of the polymer chains. We dissolved 0.2 g of PNIPAAm in 50 mL of water. It was titrated with 0.01 N NaOH and phenolphthalein as an indicator.

Scanning Electronic Microscopy. The surfaces of silicon wafers grafted by a crosslinked PNIPAAm layer were observed by SEM (SEM, LEO 982). The thickness of the grafted PNIPAAm were measured at seven randomly chosen points. The mean data were taken as final data as seen in the Results and Discussion section. They have a standard deviation less than 10%.

Attenuated Total Reflectance Fourier Transfer Infrared (ATR-FTIR). A silicone wafer grafted by a crosslinked PNIPAAm layer was measured by the ATR-FTIR technique using specular reflectance (Spectra Tech.Inc.) as the reflection unit and recorded by FTIR (Magan-IR 860, Nicolet). Approximately 1000 scans were collected between 4000 and 500 cm$^{-1}$, and the spectral resolution was 4 cm$^{-1}$. The FTIR spectrun of linear PNIPAAm was recorded by pellets prepared from a mixture of PNIPAAm (1 vol. %) and KBr. The scan number and the spectral resolution were 100 and 4 cm$^{-1}$, respectively.

Transimittance measurement of linear PNIPAAm solution. The LCST of linear PNIPAAm was determined by measuring the optical transmittance of the polymer solution. The optical transmittance of the polymer solution (5 mg/mL) was recorded at 500 nm at various temperatures using a UV-visible spectrophotometer (HP 8543). The temperature of the observation cell (HP G1120A) was controlled with a thermal water bath with a deviation of ±0.02° C.

Change of water meniscus height in capillary tube. We used a ruler to measure the change of water meniscus height when a capillary tube was dipped into water at various temperatures. Because the inner surface of the capillary tube was grafted with PNIPAAm, the hydrophilic/hydrophobic surface properties on the wall of the capillary tube reversed when it was immersed in water with different temperatures. When the temperature is higher than the LCST of the PNIPAAm, the surface of the capillary tube is hydrophobic and repels water, causing the water meniscus inside tube to reach its lowest position. Conversely, the surface of the capillary tube shows hydrophilic properties at temperatures lower than the LCST of the PNIPAAm and the water meniscus reaches its highest position.

Discussion of Results of Crosslinked PNIPAAm Hydrogel Coating

1. SEM photomicrographs

FIG. 1 shows the SEM pictures of the surface grafted by a crosslinked PNIPAAm layer at different molar ratios of NIPAAm to BisAAm. It can be seen that the crosslinked PNIPAAm layers (dark areas) were randomly distributed on the surface of the silicon wafer when the molar ratio of NIPAAm to BisAAm was 400. The morphology of the surface changed to "sea-island" when the molar ratio of NIPAAm to BisAAm reached 200—almost one half the surface area was grafted by cross-linked PNIPAAm. The whole surface was covered with a crosslinked PNIPAAm layer with the morphology of "mountain-valley" when the molar ratio of NIPAAm to BisAAm reached 50. The BisAAm with a higher reactivity accelerated the crosslinking reaction, which caused more hydrogel to be grafted on the surface of the silicon wafer. In fact, under the same reaction conditions, without BisAAm, no hydrogel can be found either on the surface of the silicone wafer or in solution, which demonstrates that the crosslinking agent is necessary as the compound to form a crosslinked PNIPAAm layer on the surface of the silicon wafer.

Figure 8:
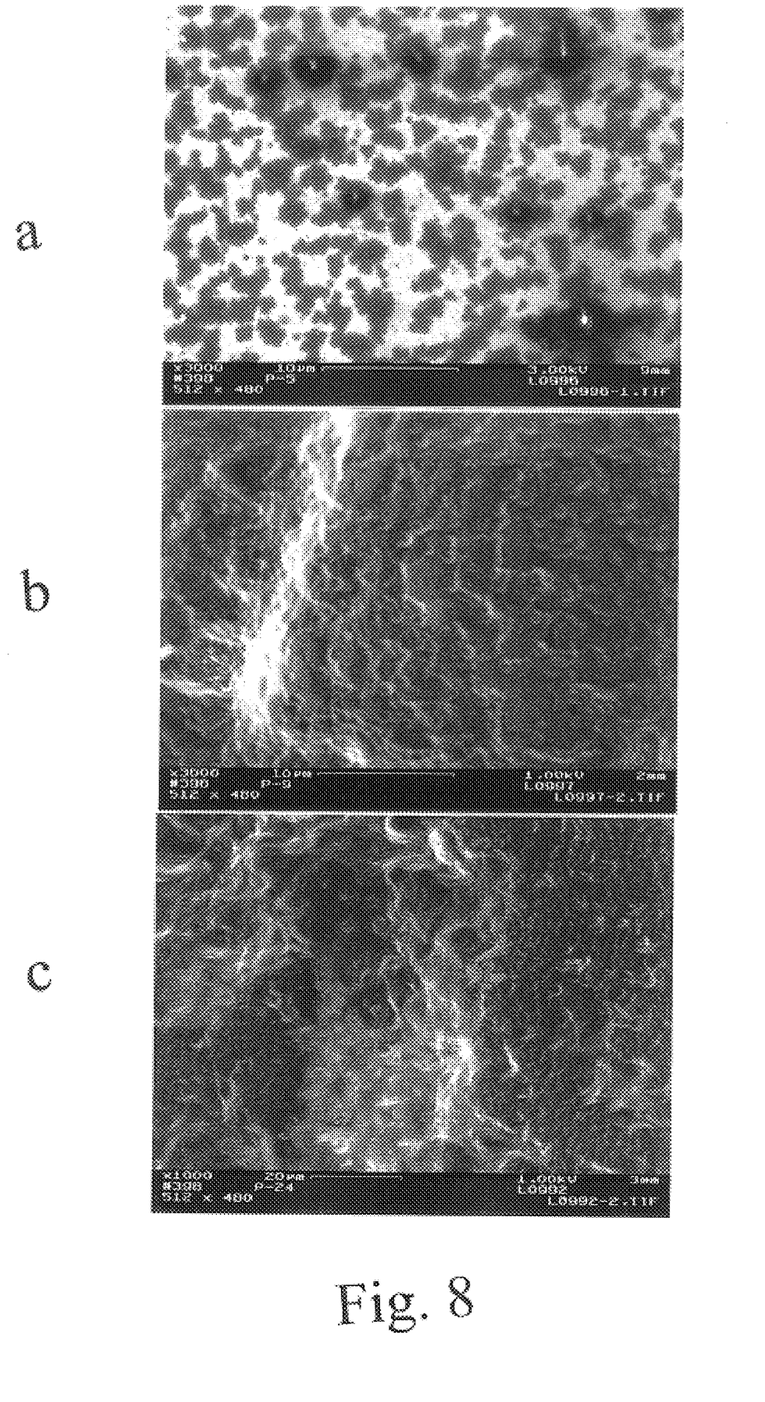
FIG. 8. SEM pictures of silicone wafer surfaces grafted by a crosslinked PNIPAAm layer with different polymerization times. (a) polymerization time: 5 hours; (b) polymerization time: 9 hours; (c) polymerization time: 24 hours. In crosslinked PNIPAAm layer: molar ratio of NIPAAm to BisAAm: 100; concentration of NIPAAm: 7 wt %; solvent: water.

FIG. 8 shows the SEM pictures of the surfaces grafted with a crosslinked PNIPAAm layer at different polymerization times with the molar ratio of NIPAAm to BisAAm kept at 100. As shown in the figure, the morphology of "sea-island" (FIG. 8a) changed to "mountain-valley" (FIG. 8b) when the polymerization time increased from 5 hours to 9 hours. Thus, by increasing the polymerization time, more monomer and crosslinking agent can be grafted on the surface, which increases both grafting density and the thickness of the grafting layer. When the polymerization time was further increased to 24 hours (FIG. 8c), there was no change observed by SEM, as compared to the surface after 9 hours of polymerization (FIG. 8b).

2. FTIR spectra

FTIR spectra were obtained of linear PNIPAAm and the surface grafted by a crosslinked PNIPAAm layer. An absorption peak at 3310 cm$^{-1}$ was attributed to the stretch for the hydrogen-bonded NH group. The antisymmetric stretching vibration of the $CH_3$ group was observed at 2970 cm$^{-1}$. The $C=O$ groups give rise to a strong band at 1640 cm$^{-1}$. The mixed vibration of CN and NH appears at 1370 cm$^{-1}$, and antisymmetric deformation of $CH_3$ is at 1450 cm$^{-1}$. As the major absorption peaks of the surface grafted by the crosslinked PNIPAAm layer were the same as those of linear PNIPAAm, it is reasonable to conclude that the surface of the substrate was coated by PNIPAAm.

3. XPS Measurement

The elemental compositions at the surface of the silicone wafer grafted by the crosslinked PNIPAAm layer are determined from the peak area of XPS spectra. The compositions of the elements C, O, N, and Si are listed in Table 4. The ratio of N to C calculated from XPS data was almost the same regardless of the different testing places and was in good agreement with the theoretical ratio of N to C calculated from the formulation of NIPAAm. XPS measurement confirmed that PNIPAAm covered the surface of the substrate.

TABLE 4

Composition of Surface Grafted by PNIPAAm/BisAAm Gel

| | Element (%) In PNIPAAm/BisAAm crosslinked network: NIPAAm/BisAAm (molar ratio) = 100 | | | | |
|---|---|---|---|---|---|
| Tested points | C | N | O | Si | N/C* |
| 1 | 73.68 | 9.75 | 14.21 | 2.36 | 0.132 |
| 2 | 74.49 | 10.85 | 13.13 | 1.52 | 0.145 |
| 3 | 73.29 | 10.67 | 13.84 | 2.19 | 0.145 |
| Mean | 73.82 | 10.42 | 13.73 | 2.03 | 0.141 |
| Standard Deviation | 0.61 | 0.59 | 0.55 | 0.45 | 0.008 |

TABLE 4-continued

| | Element (%) In PNIPAAm/BisAAm crosslinked network: NIPAAm/BisAAm (molar ratio) = 400 | | | | |
|---|---|---|---|---|---|
| Tested points | C | N | O | Si | N/C |
| 1 | 73.26 | 11.30 | 13.85 | 1.60 | 0.154 |
| 2 | 72.38 | 12.17 | 14.13 | 1.32 | 0.168 |
| 3 | 75.88 | 11.25 | 12.87 | — | 0.148 |
| 4 | 75.77 | 11.71 | 12.52 | — | 0.155 |
| Mean | 74.32 | 11.61 | 13.34 | 1.46 | 0.156 |
| Standard Deviation | 1.77 | 0.43 | 0.77 | 0.20 | 0.008 |

*N/C = 0.166 (calculated by molecular structure of NIPAAm).

4. Characteristics of Reversible Hydrophilic/Hydrophobic Surface

Figure 9:
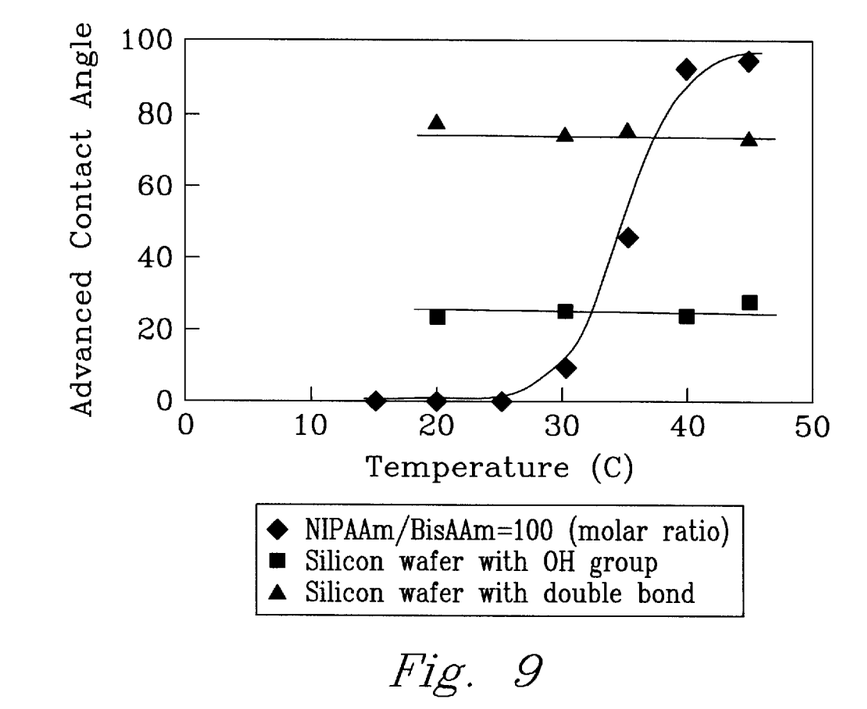
FIG. 9. Effect of temperature on the advancing contact angle of different surfaces. (■) surface with OH groups; (Δ) surface with VTES groups; (♦) surface grafted by a crosslinked PNIPAAm layer (molar ratio of NIPAAm to BisAAm: 100).

The effect of temperature on the surface properties modified by a crosslinked PNIPAAm layer was evaluated by aqueous dynamic contact-angle measurements, and the results are shown in FIG. 9. For comparison, the surface properties of the silicon wafer before and after coating with VTES are also given in FIG. 9. The surface grafted by a crosslinked PNIPAAm layer shows typical thermal-response characteristics. The advancing contact angle below 25° C. is 0° (cos θ=1) and becomes 92° (cos θ=−0.034) above 40° C. A larger discontinous surface wettability change was observed in the temperature range of 27° C. to 35° C. Below LCST, the crosslinked PNIPAAm layer swelled by imbibing water. Water spreads on the surface of the substrate. Consequently, the contact angle of the surface is lower. Above LCST, the crosslinked PNIPAAm layer shrinks and becomes more hydrophobic so that water cannot spread on the surface, and the surface exhibits a higher contact angle. It was found that the effects of raising and lowering temperature were completely reversible over the course of several cycles.

The advancing contact angle of surfaces with OH and SiCH=$CH_2$ groups, respectively, remained unchanged with variation of temperature. This is because neither the OH group nor the SiCH=$CH_2$ group has a thermal response. The lower advancing contact angle of the silicon wafer with OH groups and the higher contact angle of the silicon wafer with the SiCH=$CH_2$ group is attributed to the hydrophilic and hydrophobic properties of the OH and SiCH=$CH_2$ groups, respectively.

Compared with the broader range of temperature needed to change the advancing contact angle, shown in FIG. 9, a narrower range of temperature changed the transmittance of a linear PNIPAAm solution solution. This is because the mobility and flexiblility of the linear PNIPAAm chain in solution increased its sensitivity to thermal response. In comparison, the mobility of the crosslinked, surface-bound polymer chains was restricted because of the multipoint attachment of the polymer chain to the crosslinking network, which reduced the flexibility of the polymer chain and widened the range of temperature change by which the physical properties of the polymer can be varied.

5. Effect of Molar Ratio of NIPAAm to BisAAm

Figure 10:
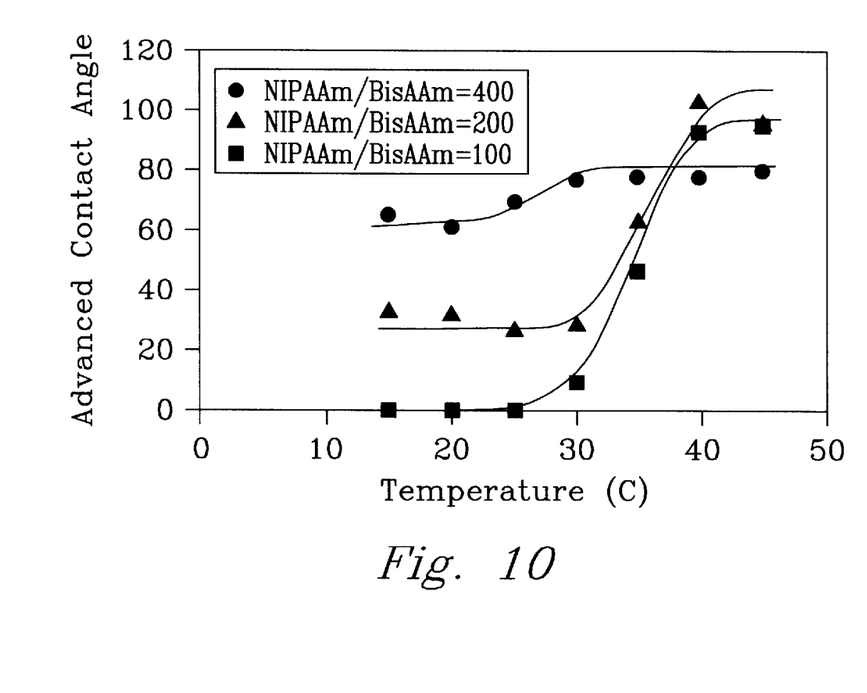
FIG. 10. Effect of molar ratio of NIPAAm to BisAAm on advancing contact angle of surface grafted by crosslinked PNIPAAm layer. (●) NIPAAm/BisAAm (molar ratio)=400; (▼) NIPAAm/BisAAm (molar ratio)=200; (■) NIPAAm/BisAAm (molar ratio)=100. Polymerization time: 24 hours; concentration of NIPAAm: 7 wt %; solvent: water.

FIG. 10 shows the temperature-dependent wettability change for surfaces grafted by a crosslinked PNIPAAm layer with different molar ratios of NIPAAm to BisAAm. The surface covered by a partially crosslinked PNIPAAm layer (NIPAAm/BisAAm=400) exhibited a higher contact angle below LCST and a lower contact angle above LCST compared with the surface covered by an entirely crosslinked PNIPAAm layer (NIPAAm/BisAAm=100). Two factors affected the wettability of the surface grafted by PNIPAAm. One is the grafting density. The other is the morphology of the PNIPAAm chain. Both the increased grafting density on the surface and the mobility of the chain segment increased the sensitivity of the surface to the change of temperature. The grafting density on the surface decreased with increasing molar ratio of NIPAAm to BisAAm. Because only part of the surface can be wet by water below LCST, the surface with a higher ratio of NIPAAm/BisAAm exhibited a higher contact angle.

Figure 11:
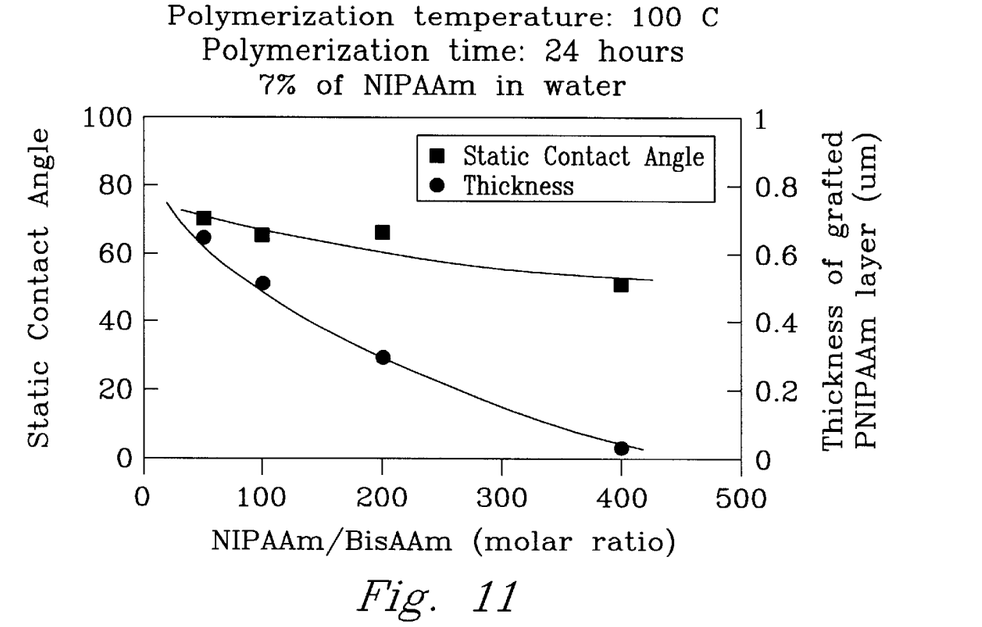
FIG. 11. Effect of molar ratio of NIPAAm to BisAAm on static contact angle and thickness of grafting PNIPAAm layer. Polymerization time: 24 hours; concentration of NIPAAm: 7 wt %; solvent: water.

FIG. 11 shows the effect on static contact angle and the thickness of the grafting layer on the surfaces modified by different molar ratios of NIPAAm to BisAAm. With increasing molar ratio of NIPAAm to BisAAm, corresponding to lower crosslinking density of the grafting layer, both the static contact angle and the thickness of the grafting layer decreased. The increased thickness of the grafting layer may be attributed to the higher reactivity of BisAAm which increased the reaction rate of the monomer that was grafted on the surface. The grafting layer with a higher crosslinking density hindered the absorption of water. It is easy for water to penetrate the grafting layer with a loose crosslinking network. It has been found that by controlling the concentration of the crosslinking agent, the morphology and grafting density of the grafting layer can be regulated, and optimum thermal response can be achieved.

6. Effect of Polymerization Time on Surface Properties

Figure 12:
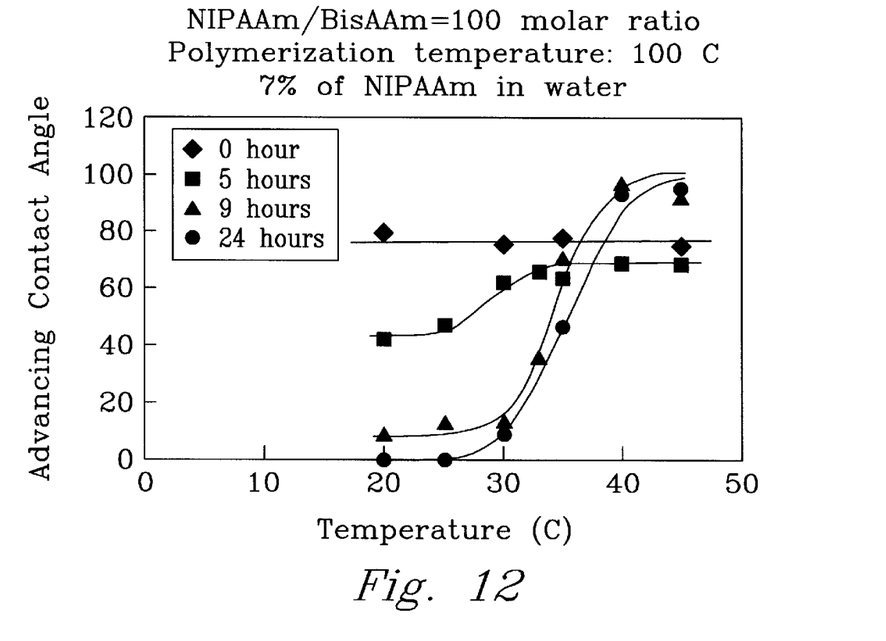
FIG. 12. Effect of polymerization time on advancing contact angle of surface grafted by crosslinked PNIPAAm layer. (♦) 0 hours; (■) 5 hours; (▼) 9 hours; (●) 24 hours. In crosslinked PNIPAAm layer: molar ratio of NIPAAm to BisAAm: 100.

The crosslinked PNIPAAm layer was generated instantaneously on the surface and slowly covered the whole space of the surface because it crosslinked quickly and slowly consumed the monomer in thermal polymerization. The thickness of the grafting layer with a higher crosslinking density and grafting density increased by increasing the polymerization time. FIG. 12 shows the effect of polymerization time on the advancing contact angle of a surface grafted by a crosslinked PNIPAAm layer at different polymerization times. A remarkable change on the advancing contact angle can be observed for surfaces modified by a longer polymerization time (>9 hours). This is because the increased grafting density on the surface as shown in SEM increased the sensitivity of the surface to the thermal change. The smallest change in advancing contact angle was observed for the surface modified with the shortest polymerization time (5 hours). This is because the surface was not totally covered by the crosslinked PNIPAAm layer as shown in SEM. Below and above LCST, the swollen or shrunken PNIPAAm gel only partially altered the properties of the surface, which resulted in the small change in the advancing contact angle.

Figure 13:
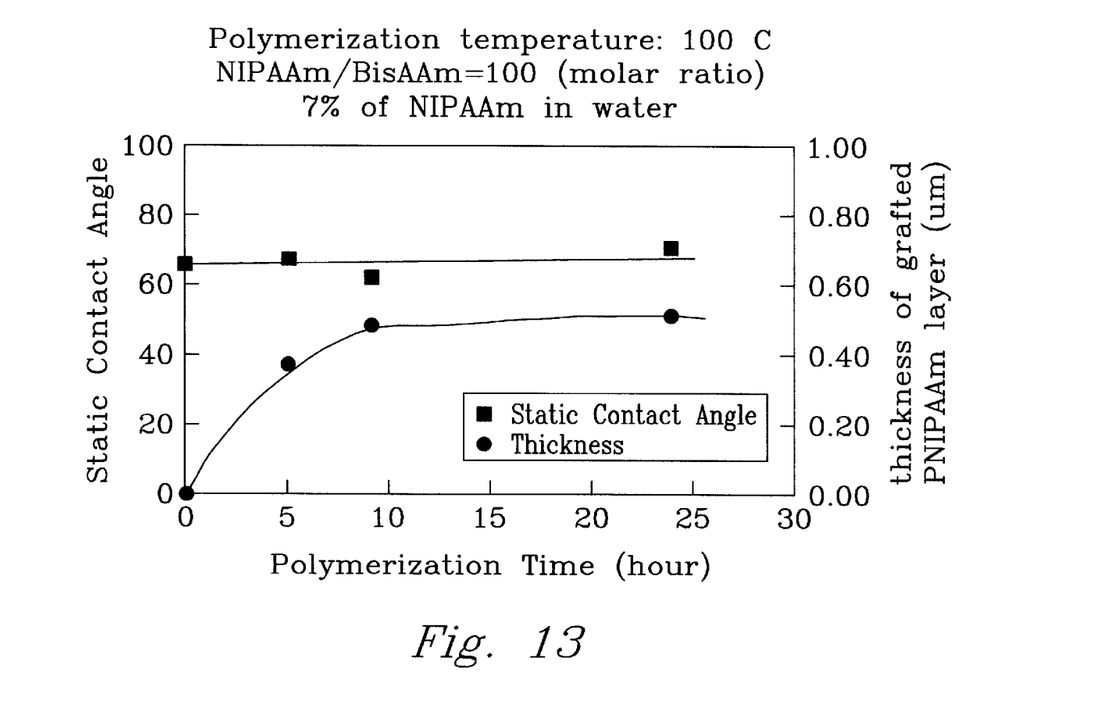
FIG. 13. Effect of polymerization time on static contact angle and thickness of grafting PNIPAAm layer. Crosslinked PNIPAAm layer: molar ratio of NIPAAm to BisAAm: 100.

FIG. 13 shows the static contact angle and the thickness of the grafting layer on the surfaces modified by different polymerization times. It is clear that the static contact angle of the surface was almost unchanged, but the thickness of the grafting layer increased as the polymerization time increased. With increasing polymerization time, more monomer can be grafted on the surface; therefore, the thickness of the grafting layer increases. The independence of the static contact angle on the polymerization time could be due to the surface with a higher crosslinking density hindering the penetration of water into the surface for a shorter time. This characteristic was also proved by dynamic contact angle in which the dried surface showed a higher advancing contact angle in the first and second immersion cycles. The lower advancing contact angle was observed after the third immersion cycle because the surface was wetted by water gradually. The crosslinked PNIPAAm layer without wetting showed hydrophobic properties and kept the static contact angle of the surface unchanged.

7. Change of Water Meniscus Height in Capillary Tube

After the capillary tube was grafted with a crosslinked PNIPAAm layer, it was expected that the water meniscus height in the capillary tube would go up or down as the surface properties of the capillary tube changed from hydrophilic to hydrophobic by responding to changes in temperature. Glass capillary tubes with diameter of 2 and 3 mm and the inside wall coated by a crosslinked PNIPAAm layer were evaluated by immersing the capillary tube vertically in water at low temperature (23° C.) and high temperature (50° C.). Table 5 lists the change of water meniscus height at different temperatures for each tube. Below LCST, hydrogen bonding between the hydrophilic surface of capillary tube and the water caused the adhesive force between the water and the well of the capillary tube to exceed the cohesive force within the water. Therefore, the water meniscus height in the tube ascended. Conversely, above LCST, the water in the tube retracted from the hydrophobic wall with hydrophobicity because the adhesive force between water and the wall of the capillary tube was smaller than the cohesive force within water. It was found that the change of water meniscus height is reversible.

TABLE 5

Change of Water Meniscus Level in Capillary Tube

| Diameter of capillary tube (mm) | Water meniscus level (mm) 23° C. | Water meniscus level (mm) 50° C. |
|---|---|---|
| 2 | 10 | ~0 |
| 3 | 5 | ~0 |

The morphology and properties of temperature-sensitive surfaces can be regulated by controlling factors such as the molar ratio of NIPAAm to BisAAm and polymerization time. Increasing the concentration of BisAAm and polymerization time increased both the thickness of the grafting layer and the grafting density on the surface. The variation range of the advancing contact angle increased by increasing the grafting density on the surface and the thickness of the grafting layer. A completely hydrophilic surface (advancing contact angle=0°) was observed below 25° C., and the surface became extremely hydrophobic (advancing contact angle=92°) above 40° C.

Compared with the smoothness of a surface of a PNIPAAm layer crosslinked by UV photopolymerization (see Liang et al., Macromolecules, 31, 7845 (1998)), thermal polymerization generated rough surfaces. It was surprisingly found that surfaces with a rough morphology can rapidly respond to temperature changes and demonstrate remarkable changes in surface properties. This may be due to the polymer chain being highly mobile in the rough morphology.

The water meniscus height in a capillary tube coated by a crosslinked PNIPAAm layer with either UV photo polymerization or thermal polymerization can be adjusted through temperature change. The water meniscus height in a capillary tube modified with thermal polymerization with a diameter of 2.0 mm increased 10 mm, compared to 7 mm for a capillary tube modified by UV photopolymerization. This is another demonstration that the grafted surface discussed in this paper exhibit remarkable changes in their hydrophilic/hydrophobic properties.

CLOSURE

While preferred embodiments of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An article comprising a temperature sensitive surface;
   wherein said thermally sensitive surface comprises a thin coating disposed over a substrate;
   said thin coating comprising the reaction product of IPAAm and said thin coating having a thickness of less than 50 nm; and
   further wherein said temperature sensitive surface has a LCST of at least 25° C. and an advancing contact angle of less than 60° at low temperature and greater than 80° at high temperature.

2. The article of claim 1 wherein said substrate comprises material selected from the group consisting of silicon, glass, and plastic.

3. The article of claim 2 wherein said substrate comprises at least a portion of a microcomponent.

4. The article of claim 3 wherein said microcomponent comprises a microchannel.

5. The article of claim 1 wherein the thin coating is made by a process comprising photoinitiated polymerization in which there is essentially no cross-linker present.

6. The article of claim 1 wherein said thin coating has thickness of between 4 and 10 nm.

7. The article of claim 1 wherein the temperature sensitive surface has an advancing contact angle of between 40 and 55° at low temperature and between 85 and 100° at high temperature.

8. The article of claim 7 wherein the thin coating has a thickness of between 4 and 10 nm.

9. The article of claim 7 wherein the temperature sensitive surface has a LCST of greater than 28° C.

10. The article of claim 1 wherein the temperature sensitive surface has a LCST of at least 30° C.

11. The article of claim 10 wherein the thin coating has a thickness of between 4 and 10 nm.

12. The article of claim 10 wherein the temperature sensitive surface has an advancing contact angle of between 40 and 55° at low temperature and between 85 and 100° at high temperature.

13. An article comprising a temperature sensitive surface;
   wherein said thermally sensitive surface comprises a coating disposed over a substrate;
   said coating comprising the reaction product of IPAAm and a crosslinking agent; and
   further wherein said temperature sensitive surface has an advancing contact angle of less than 20° at low temperature and greater than 80° at high temperature.

14. The article of claim 13 wherein said substrate comprises material selected from the group consisting of silicon, glass, and plastic.

15. The article of claim 14 wherein said reaction product is made by thermal polymerization.

16. The article of claim 15 wherein the molar ratio of IPAAm to crosslinking agent is between 200 and 1000.

17. The article of claim 16 wherein the crosslinking agent comprises BisAAm.

18. The article of claim 16 wherein said temperature sensitive surface has an advancing contact angle of less than 10° at low temperature and greater than 90° at high temperature.

19. The article of claim 15 wherein the molar ratio of IPAAm to crosslinking agent is between 300 and 500.

20. The article of claim 19 wherein said coating has a thickness of between 0.4 and 0.8 micrometers.

21. The article of claim 20 wherein the temperature sensitive surface has an advancing contact angle of less than 10° at low temperature and greater than 90° at high temperature.

22. The article of claim 14 wherein the temperature sensitive surface has an advancing contact angle of less than 10° at low temperature and greater than 90° at high temperature.

23. The article of claim 13 wherein the temperature sensitive surface has an advancing contact angle of less than 10° at low temperature and greater than 90° at high temperature.

* * * * *